(12) United States Patent
Dobschal

(10) Patent No.: US 11,624,918 B2
(45) Date of Patent: Apr. 11, 2023

(54) SPECTACLE LENS FOR A DISPLAY DEVICE THAT CAN BE FITTED ON THE HEAD OF A USER AND GENERATES AN IMAGE, AND DISPLAY DEVICE WITH SUCH A SPECTACLE LENS

(71) Applicant: tooz technologies GmbH, Aalen (DE)

(72) Inventor: Hans-Juergen Dobschal, Kleinromstedt (DE)

(73) Assignee: tooz technologies GmbH, Aalen (DE)

( * ) Notice: Subject to any disclaimer, the term of this patent is extended or adjusted under 35 U.S.C. 154(b) by 206 days.

(21) Appl. No.: 16/848,783

(22) Filed: Apr. 14, 2020

(65) Prior Publication Data

US 2020/0241303 A1 Jul. 30, 2020

Related U.S. Application Data

(63) Continuation of application No. 15/025,205, filed as application No. PCT/EP2014/070557 on Sep. 25, 2014, now Pat. No. 10,656,420.

(30) Foreign Application Priority Data

Sep. 27, 2013 (DE) .......................... 102013219625.3

(51) Int. Cl.
G02B 27/42 (2006.01)
G02B 27/01 (2006.01)
(Continued)

(52) U.S. Cl.
CPC ....... G02B 27/0172 (2013.01); G02B 5/1842 (2013.01); G02B 27/4216 (2013.01);
(Continued)

(58) Field of Classification Search
CPC ............ G02B 27/0172; G02B 27/4216; G02B 6/0038; G02B 2027/011;
(Continued)

(56) References Cited

U.S. PATENT DOCUMENTS 9,081,178 B2 * 7/2015 Simmonds ........... G02B 6/0028
2006/0132914 A1 * 6/2006 Weiss .................. G02B 27/143
359/462
(Continued)

*Primary Examiner* — Audrey Y Chang
(74) *Attorney, Agent, or Firm* — Skaar Ulbrich Macari, P.A.

(57) ABSTRACT

A spectacle lens for a display device that can be fitted on the head of a user and generate an image. A coupling-in section in an edge area of the spectacle lens and a coupling-out section in a central area of the spectacle lens. The spectacle lens is suitable for coupling light bundles of pixels of the generated image into the spectacle lens via the coupling-in section, guiding them in the spectacle lens to the coupling-out section and coupling them out of the spectacle lens via the coupling-out section. The coupling-in section can divide at least one of the light bundles into several first sub-bundles and couple them into the spectacle lens offset from each other in a first direction such that the first sub-bundles are guided in the spectacle lens to the coupling-out section along a second direction running transverse with respect to the first direction.

5 Claims, 7 Drawing Sheets

(51) Int. Cl.
*G02B 5/18* (2006.01)
*F21V 8/00* (2006.01)

(52) U.S. Cl.
CPC ........ G02B 27/4272 (2013.01); *G02B 6/0038* (2013.01); *G02B 2027/011* (2013.01); *G02B 2027/013* (2013.01); *G02B 2027/0123* (2013.01); *G02B 2027/0125* (2013.01); *G02B 2027/0178* (2013.01)

(58) Field of Classification Search
CPC .... G02B 2027/0123; G02B 2027/0125; G02B 2027/013; G02B 2027/0178; G02B 27/017; G02C 7/086
USPC .................................... 359/630, 633, 15, 34
See application file for complete search history.

(56) References Cited

U.S. PATENT DOCUMENTS

| | | | | |
|---|---|---|---|---|
| 2011/0019250 A1* | 1/2011 | Aiki | ........................ | G02B 5/32 359/15 |
| 2011/0075970 A1* | 3/2011 | Schrauwen | .............. | G02B 6/34 385/37 |

* cited by examiner

SPECTACLE LENS FOR A DISPLAY DEVICE THAT CAN BE FITTED ON THE HEAD OF A USER AND GENERATES AN IMAGE, AND DISPLAY DEVICE WITH SUCH A SPECTACLE LENS

PRIORITY

This application is a continuation of U.S. patent application Ser. No. 15/025,205, which has a § 371(c) date of Mar. 25, 2016, which is a U.S. National Phase filing under § 371 of PCT/EP2014/070557, filed on Sep. 25, 2014, which claims the benefit of German Patent Application No. 02013219625.3 filed on Sep. 27, 2013. All of the foregoing applications are hereby incorporated herein by reference in their entirety.

FIELD

The present invention relates to a spectacle lens for a display device that can be fitted on the head of a user and generates an image, and a display device with such a spectacle lens.

BACKGROUND

With a spectacle lens, it is desired in principle that the latter is as thin as possible in order to ensure the desired wearing comfort. However, the thin formation of the spectacle lens leads, disadvantageously, to the eyebox (i.e. the area in which the image which is guided in the spectacle lens and coupled out of the spectacle lens can be perceived as a virtual image) being very small as a rule.

SUMMARY

An object of the invention includes providing a spectacle lens for a display device that can be fitted on the head of a user and generate an image. The spectacle lens can include a curved front and/or a curved rear side and a large eyebox with, at the same time, a sufficiently large field of view can be provided.

The disclosure includes a spectacle lens for a display device that can be fitted on the head of a user and generates an image, wherein the spectacle lens comprises a front side and a rear side and the front side and/or the rear side is/are curved and, seen in top view onto the spectacle lens, comprises a coupling-in section in an edge area of the spectacle lens and a coupling-out section in the central area of the spectacle lens, wherein the spectacle lens is suitable for coupling light bundles of pixels of the generated image into the spectacle lens via the coupling-in section, guiding them in the spectacle lens to the coupling-out section, and coupling them out of the spectacle lens via the coupling-out section in order to display the generated image as a virtual image, wherein, during the coupling-in, the coupling-in section divides at least one of the light bundles in each case into several first sub-bundles in such a way and couples them into the spectacle lens offset from each other in a first direction in such a way that the first sub-bundles are guided in the spectacle lens to the coupling-out section along a second direction running transverse with respect to the first direction, and wherein, during the coupling-out, the coupling-out section divides at least one of the first sub-bundles in each case into several second sub-bundles and couples them out of the spectacle lens offset from each other in the second direction.

In the case of the spectacle lens, the coupling-in section is thus formed as a first beam expander which carries out an expansion in the first direction. The coupling-out section is formed as a second beam expander which carries out an expansion in the second direction. As a result, the eyebox (the area in which a user can perceive the coupled-out virtual image) is enlarged both in the first and the second direction in comparison with a spectacle lens in which the described expansions in the first and second direction are not carried out.

The first and second direction are preferably orthogonal to each other.

The coupling-in and/or the coupling-out section can have an imaging property. In particular, the coupling-in and the coupling-out section can in each case comprise a grating. The gratings can, in each case, be formed as reflective grating and, in particular, as reflective volume grating or reflective hologram. Furthermore, it is possible for the gratings to be formed at the front side or the rear side of the spectacle lens.

In particular, the grating or gratings of the coupling-in and/or coupling-out section can be formed as imaging grating. It is thus possible to compensate for imaging errors which arise in particular because the light bundles strike the coupling-out grating at a very flat angle (e.g. because of the guiding by total reflection in the spectacle lens). This relates, in particular, to astigmatism and coma.

The first sub-bundles can strike the grating of the coupling-out section (also called coupling-out grating below) a maximum of n times depending on the position of the associated pixel, wherein n is an integer greater than or equal to three, and wherein the first sub-bundles are coupled out depending on the position of the associated pixel at 1 to m successive strikes on the grating of the coupling-out section, wherein m is an integer greater than or equal to one and is smaller than n and the coupling-out begins, at the latest, at the $(n-m+1)^{th}$ strike.

By means of this coupling-out of the light bundles or of the corresponding second sub-bundles depending on the position of the associated pixel, the coupling-out grating can be adapted to the striking first sub-bundles in such a way that the desired eyebox can be realized with, at the same time, a predetermined field of view. As the first sub-bundles in each case strike the coupling-out grating at different locations with their successive strikes, the corresponding adaptation of the coupling-out grating which is necessary for this is easily possible.

Furthermore, in the case of the spectacle lens according to the invention, the grating of the coupling-out section can be designed such that its diffraction efficiency for a first sub-bundle increases from the first to the $m^{th}$ coupling-out.

In the case of the spectacle lens according to the invention, the grating of the coupling-in section and the grating of the coupling-out section can, in each case, be a superimposition of several individual gratings which are designed for different center frequencies, wherein the center frequencies of the individual gratings for the two gratings in each case coincide in pairs.

The coupling-in section can comprise a first and a second coupling-in grating, wherein the at least one light bundle is deflected onto the second coupling-in grating by the first coupling-in grating and the second coupling-in grating brings about the division into the several first sub-bundles. The first and second coupling-in gratings can, in each case, be formed as a reflective grating and, in particular, as a reflective volume grating or reflective hologram. The two coupling-in gratings can be further developed in the same way as the two gratings of the coupling-in and coupling-out section for coupling the first sub-bundle into the spectacle lens and for coupling out the second sub-bundle.

The first and second coupling-in gratings can be formed such that wavelength-dependent diffraction effects are compensated. For this, e.g. the first order of diffraction of the first coupling-in grating can be used for deflection onto the second coupling-in grating. The division into the several first sub-bundles then takes place at the second coupling-in grating, preferably also by means of the first order of diffraction. The portion of the light bundle which is to strike the second coupling-in grating again is reflected at the second coupling-in grating by means of the zero order of diffraction during the previous strike or strikes.

Of course, the gratings of the coupling-in and/or coupling-out section can also be formed as transmissive gratings.

A reflective surface (e.g. a reflective layer, a reflective layer system or a boundary surface at which total internal reflection takes place), which can be used so that the at least one light bundle strikes the second coupling-in grating several times at different positions, can lie opposite the second coupling-in grating.

The coupling-in section and/or the coupling-out section can comprise several partially reflective facets in order to bring about the division into the first and/or second sub-bundles by means of reflection and transmission (and not by means of a diffractive effect).

In each case, a reflective layer or a reflective surface (such as e.g. a surface for total internal reflection) can be arranged behind the partially reflective facets, with the result that portions transmitted through the facets are reflected at this reflective layer or surface, run from behind through the partially reflective facets and are again reflected by a second reflective layer or reflective surface onto the reflective facets at a location which is offset relative to the first strike.

The reflectivity of the partially reflective facets can increase from the first to the last division into the corresponding sub-bundles.

The coupling-out section can be part of the spectacle lens. However, it is possible for the coupling-out section to be produced separately and to be connected to the spectacle lens at the edge area.

The spectacle lens according to the invention can be produced from glass and/or plastic.

If only the front side or only the rear side of the spectacle lens is formed curved, the other of the two sides is flat. Preferably, both the front side and the rear side are formed curved.

In particular, the grating or gratings or the facets of the coupling-in and/or coupling-out sections can be formed at the front side of the spectacle lens. The front side is the side which points away from the eye of the user during intended use.

By a facet is meant, in particular, a piece of surface, a surface element or a surface. The piece of surface, the surface element or the surface can provide the described optical effect of the facet.

The spectacle lens can be formed such that several couplings-out of a first sub-bundle and thus several second sub-bundles of the first sub-bundle partially overlap in the eyebox.

The spectacle lens and the coupling-out section can be formed such that the user can perceive the generated image superimposed with the surroundings.

The spectacle lens can also be referred to as a two-dimensional beam expander.

The coupling-in section can e.g. have a collimating effect in such a way that the at least one light bundle is first of all collimated and then divided into the first sub-bundles.

The disclosure also includes a display device, with a holder that can be fitted on the head of a user, an image-generating module secured to the holder, which generates an image, and an imaging optical system secured to the holder, which comprises a spectacle lens according to the invention and which, when the holder is fitted on the head, images the generated image such that the user can perceive it as a virtual image. The holder can be in the style of a pair of spectacles.

The imaging optical system can comprise the spectacle lens as the only optical element. However, it is also possible for the imaging optical system to comprise, in addition to the spectacle lens, at least one further optical element.

Thus, the further optical element can be, e.g., a collimation optical system which is arranged between the spectacle lens and the image-generating module, with the result that the light bundles from the image-generating module are coupled into the spectacle lens as collimated bundles.

The image-generating module can in particular comprise a two-dimensional imaging system, such as e.g. an LCD module, an LCoS module, an OLED module or a tilting mirror matrix. The imaging system can be self-luminous or not self-luminous.

The image-generating module can in particular be formed such that it generates a monochromatic or a multi-colored image.

In addition, a graduated filter can be arranged between the spectacle lens and the image-generating module. In addition, or alternatively, the image-generating module can comprise a location-dependent variation of the radiated light intensity. Thereby, in turn, an intensity which is as homogeneous as possible can be achieved in the image which can be perceived by the user.

The display device according to the invention can comprise further elements known to a person skilled in the art which are necessary for its operation.

It is understood that the features named above and those yet to be explained below can be used not only in the stated combinations but also in other combinations or alone, without departing from the framework of the present invention.

Figure 1:
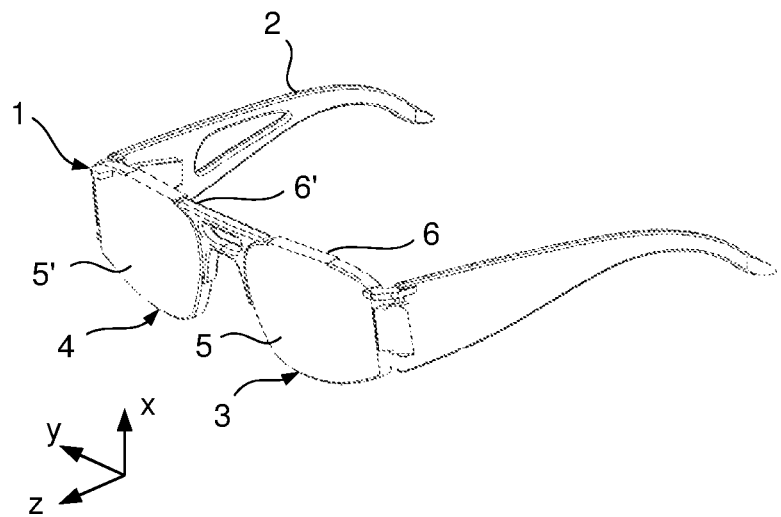
FIG. 1 is a schematic perspective representation of an embodiment of the display device according to the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1 the display device 1 according to the invention comprises a holder 2 that can be fitted on the head of a user and which can be formed e.g. in the manner of a conventional spectacles frame, as well as a first and a second light guiding element 3, 4 in the form of a first and second spectacle lens, which are secured to the holder 2.

The two spectacle lenses 3, 4 in each case comprise a curved front side 5, 5' and a curved rear side 6 6'.

Figure 2:
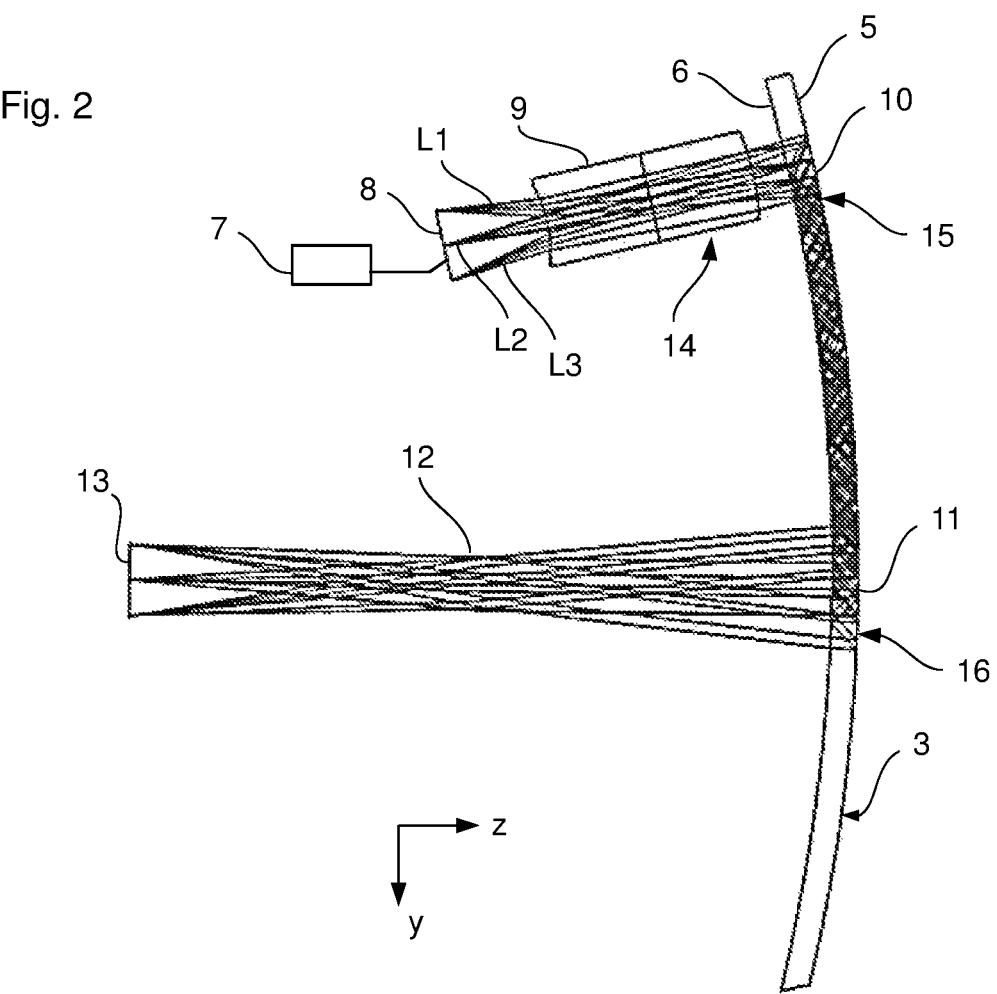
FIG. 2 is a sectional view of the first spectacle lens of the display device from FIG. 1.

In FIG. 2, in a schematic top view, the first spectacle lens 3 is shown in conjunction with further parts of the display device 1 according to the invention. The spectacle lens has a thickness of 1.5 mm, wherein the radius of curvature of the front and rear side 5, 6 is 100 mm in each case. PMMA (Zeomex) is used as material for the spectacle lens 3. The display device 1 furthermore comprises a control unit 7, an image-generating module 8 (which comprises, here, for example, a two-dimensional light modulator in the form of an OLED module) as well as an additional optical system 9 arranged between the image-generating module 8 and the first spectacle lens 3. The additional optical system 9 is optionally provided.

In an edge area 15 of the first spectacle lens 3, a diffractive coupling-in section 10 is formed and, spaced apart therefrom, a diffractive coupling-out section 11 is formed in a central area 16 of the spectacle lens 3. Furthermore, the pupil 12 and the retina 13 of an eye of a user wearing the display device 1 according to the invention is drawn in schematically in FIG. 2. In addition, the beam path of three light bundles L1, L2 and L3 from the image-generating module 8 to the retina 13 is drawn in schematically.

The light bundles L1-L3 emitted by the imaging system 8 (each light bundle L1-L3 emerges from one of several pixels of the two-dimensional light modulator of the image-generating module 8) are directed by the additional optical system 9 onto the rear side 6 of the first spectacle lens 3, enter the spectacle lens 3 via the rear side 6 and strike the coupling-in section 10. At the coupling-in section 10, the light bundles L1-L3 are each divided into four first sub-bundles $L1_1$, $L1_2$, $L1_3$ and $L1_4$ which are offset or spaced apart from each other in the x direction (first direction), as is represented schematically in FIG. 3. To simplify the representation, in FIG. 3 only the light bundle L1 and the four first sub-bundles $L1_1$-$L1_4$ are represented and in the representation in FIG. 3 as well as in FIGS. 4 and 5 the front and rear side 5, 6 are shown not curved but flat. Furthermore, in the following description, essentially only the light bundle L1 is mentioned. Of course, the description also relates to the other light bundles L2, L3 of the image-generating module 8.

The first sub-bundles $L1_1$-$L1_4$ are deflected further by the coupling-in section 10 in a second direction (y direction) and coupled into the spectacle lens 3 such that they strike the rear side 6 at an angle at which total internal reflection occurs. Thus, the first sub-bundles $L1_1$-$L1_4$ are guided by means of total internal reflection at the rear and front side 6, 5 to the coupling-out section 11, which brings about a coupling-out of the first sub-bundles $L1_1$-$L1_4$ via the rear side 6 such that a user can perceive an image generated by the imaging system 8 as a virtual image. The coupling-out takes place in such a way that the first sub-bundles $L1_1$-$L1_4$ are each divided into several second sub-bundles $L1_{11}$-$L1_{14}$ and coupled out in the y direction spaced apart from each other, as is described in detail below. The additional optical system 9 in conjunction with the first spectacle lens 3 and the coupling-in and coupling-out sections 10, 11 thus form an imaging optical system 14 which images the image generated by means of the image-generating module 8 for the user as a virtual image.

Because the guide paths of the sub-bundles $L1_1$-$L1_4$ are almost superimposed on each other in the y direction, the exit pupil of the imaging optical system 14 is enlarged in the x direction. The division into the second sub-bundles $L1_{11}$-$L1_{14}$ and the coupling-out of the latter leads to an enlargement of the exit pupil of the imaging optical system 14 in the y direction. In order that the user can perceive the virtual image, the pupil 12 of the eye of the user must lie in the exit pupil of the imaging optical system 14. As the exit pupil is enlarged in the x and y direction according to the invention, the display device 1 according to the invention can be used e.g. by different users with different eye distances (which leads to different positions of the respective pupil 12 in the y direction).

Figure 3:
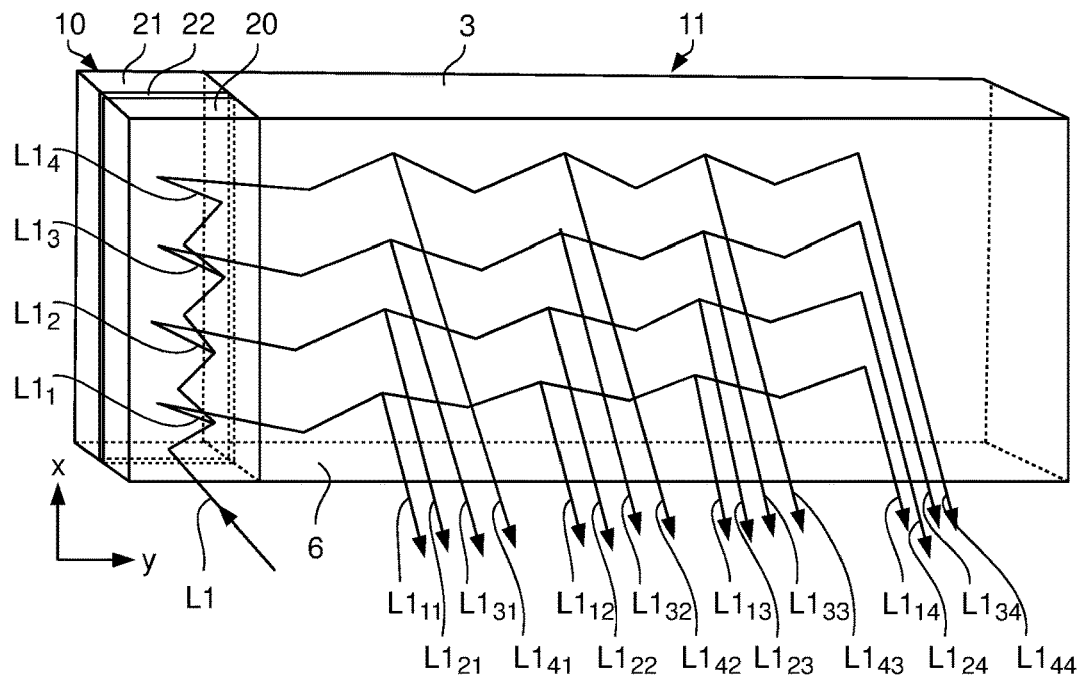
FIG. 3 is a schematic perspective representation of the spectacle lens according to the invention.
Figure 4:
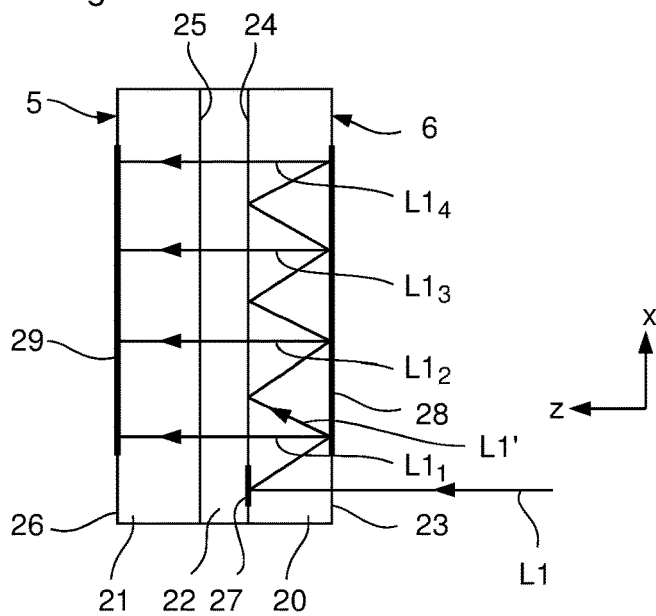
FIG. 4 is a view of the coupling-in section.
Figure 5:
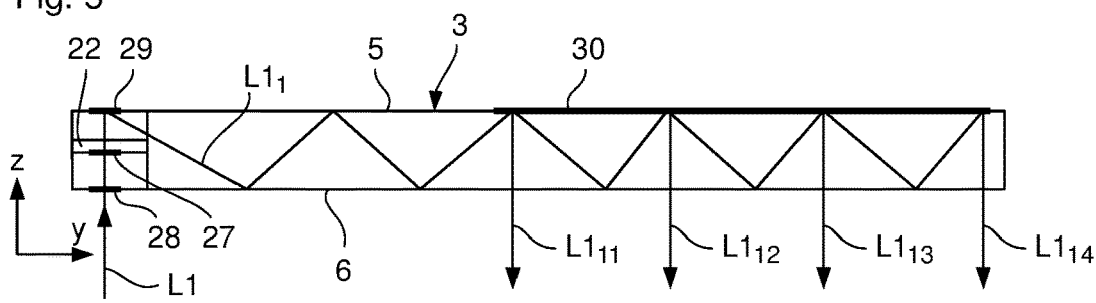
FIG. 5 is a sectional view of the spectacle lens.

First of all, in conjunction with FIGS. 3 to 5, the formation of the coupling-in section 10, which generates the first sub-bundles $L1_1$-$L1_4$ which are spaced apart in the x direction, and thus makes possible the enlargement of the exit pupil in the x direction, is described in more detail. For this, the coupling-in section 10 comprises a first plate-shaped section 20 and a second plate-shaped section 21 spaced apart therefrom, wherein between the two plate-shaped sections 20 and 21 there is an air gap 22.

The first plate-shaped section 20 comprises a first side 23 which faces away from the air gap 22, as well as a second side 24 which faces the second plate-shaped section 21. The second plate-shaped section 21 comprises a first side 25 which faces the first plate-shaped section 20 as well as a second side 26 which faces away from the first plate-shaped section 20.

The light bundles L1-L3 enter the first plate-shaped section 20 via the first side 23 thereof and run as far as the second side 24. In this area, a first reflective grating 27 is formed which diffracts (1st order of diffraction) the light bundles L1-L3 (in the following only the light bundle L1 is mentioned for the sake of simplicity) vertically or in the x direction. The vertically diffracted light bundles run to the first side 23 which, in this area, comprises a second reflective grating 28 which is formed such that a portion (first sub-bundle $L1_1$) diffracts in the direction of the second side 24 and strikes the second side 24 at such an angle (here 90°) that it leaves the first plate-shaped section 20, runs through the air gap 22, enters the second plate-shaped section 21 via the first side 25 thereof and strikes a third reflective grating 29 which is formed at the second side 26. The third grating 29 reflects the first sub-bundle $L1_1$ in the horizontal direction (y direction) such that it is guided by total internal reflection at the rear side 6 and the front side 5 to the coupling-out section 11. In the representations of FIGS. 3 and 5, the distance between the coupling-in and coupling-out section 10, 11 is represented significantly shortened.

The portion of the light bundle L1 which is not diffracted during the first strike on the second reflective grating 28 and thus the portion of the zero order of diffraction L1' is reflected towards the second side 24 of the first plate-shaped section 20 and, in turn, reflected by this towards the second side 24 at which this portion L1' again strikes the second reflective grating 28. The diffracted portion $L1_2$ runs through the second side 24, the air gap 22, the first side 25 and strikes the third reflective grating 29 at the second side 26. The area of incidence of the first sub-bundle $L1_2$ is offset in the x direction vis-à-vis the area of incidence of the first sub-bundle $L1_1$, as can be learned from FIGS. 3 and 4. The first sub-bundle $L1_2$ is in turn deflected in the horizontal direction by the third reflective grating 29 and is thus guided to the coupling-out section 11 as a result of the total internal reflection at the rear side 6 and the front side 5. As in the representations of FIGS. 3 and 4, four first sub-bundles $L1_1$-$L1_4$ are represented, the guide paths of which lie one over another in the x direction.

Each of these first sub-bundles $L1_1$-$L1_4$ is then coupled out once or several times offset with respect to each other in the y direction by means of the coupling-out section 11, as is shown in FIG. 5 by way of example only for the lowest of the guide paths of the first sub-bundle $L1_1$. The first sub-bundle $L1_1$ is divided into four second sub-bundles $L1_{11}$, $L1_{12}$, $L1_{13}$, $L1_{14}$ which are coupled out spaced apart from each other in the y direction.

In the following, to simplify the description, often only the light bundles L1-L3 are described (the corresponding first and second sub-bundles are actually meant).

The coupling-out section 11 is formed here such that it comprises a fourth reflective grating 30 which realizes the coupling out of the second sub-bundles $L1_{11}$-$L1_{14}$ via the first order of diffraction of the fourth grating 30. The portion which is not coupled out is reflected by the fourth grating 30 to the rear side 6 of the first spectacle lens 3 as zero order of diffraction such that the corresponding light bundles L1-L3 and/or a portion of the corresponding light bundles L1-L3 strike the fourth grating 30 again in an area which is spaced apart in the y direction from the area of the first strike after a total internal reflection at the rear side 6. In turn, only one portion of these light bundles L1-L3 or light bundle portions is coupled out (first order of diffraction, second sub-bundle $L1_{12}$). The remaining portion is, in turn, reflected (zero order of diffraction) towards the rear side 6 such that, after a total internal reflection at the rear side 6, the light beams of the light bundles L1-L3 or the light bundle portions in turn strike the fourth grating 30. Here, the fourth grating 30 is designed such that it carries out at most five couplings-out (in the description hitherto in conjunction with FIGS. 3-5 only four couplings-out were indicated for simplicity). Thus, with each coupling-out, a second sub-bundle $L1_{11}$-$L1_{14}$ of the respective first sub-bundle $L1_1$-$L1_4$ is generated, wherein the second sub-bundles are offset with respect to each other in the y direction. Here, the fourth grating 30 is designed such that the neighboring second sub-bundles of a first sub-bundle $L1_1$-$L1_4$ partially overlap in each case in the plane of the exit pupil. Thus the exit pupil of the imaging optical system 14 in the y direction or the eyebox of the imaging optical system 14 (the area in which the eye of the user can move and the user can always perceive the coupled-out image) in the y direction is larger than the pupil of the eye, wherein at the same time a large field of view is present in the y direction.

In the embodiment described here, the field of view provided to the user has a size of 12°×4° with a diameter of the eyebox of 7 mm, wherein a diameter of 3 mm is assumed for the pupil of the eye.

Figure 6A:
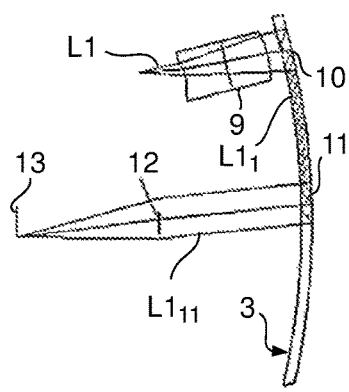
FIGS. 6a-6e are detailed views according to FIG. 2 of different couplings-out of a first light bundle.
Figure 6B:
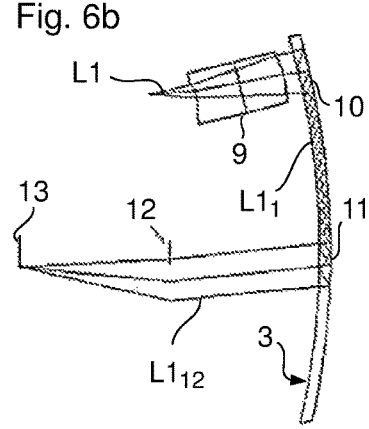
Figure 6C:
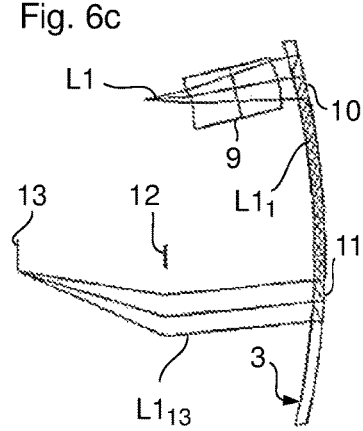
Figure 6D:
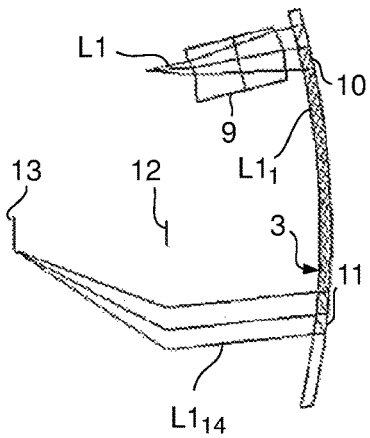
Figure 6E:
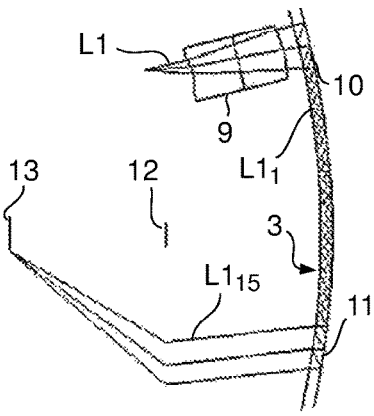

In FIGS. 6a-6e, the individual couplings-out for the upper angle of field of +6° of the field of view provided are represented schematically. The upper angle of field corresponds on the imaging system 8 (or the two-dimensional light modulator of the image-generating module) to a y value of 2 mm relative to the center of the imaging system 8. In FIG. 6a, the first coupling-out brought about during the first strike of the first sub-bundle $L1_1$ on the fourth grating 30, and thus the second sub-bundle $L1_{11}$ of the first sub-bundle $L1_1$, is shown. Then, in FIGS. 6b-6e, the second to fifth couplings-out brought about during the second to fifth strikes and thus the second sub-bundles or second partial light bundles $L1_{12}$, $L1_{13}$, $L1_{14}$, $L1_{15}$ are shown.

As can be learned from the representations in FIGS. 6a-6e, the main portion of the light which can be perceived by the user originates from the first coupling-out (second sub-bundle $L1_{11}$). A small portion originates from the second coupling-out (second sub-bundle $L1_{12}$). The user would no longer perceive the light of the third to fifth couplings-out. Therefore, the fourth grating (or the coupling-out grating) 30 is designed such that the first sub-bundle $L1_1$ is coupled out as completely as possible via the first and second couplings-out. As the third to fifth couplings-out would not strike the pupil of the eye 12, the coupling-out grating 30 is not designed for this. For example, the corresponding second sub-bundles $L1_{13}$-$L1_{15}$ are not taken into account in the usual optimization calculation for determining the necessary grating parameters.

Figure 7:
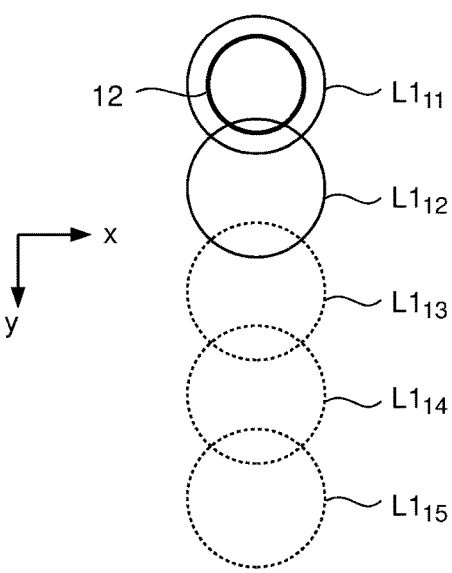
FIG. 7 is a top view of the coupled-out partial light bundle according to FIGS. 6a-6e in the plane of the pupil of the eye.
Figure 8A:
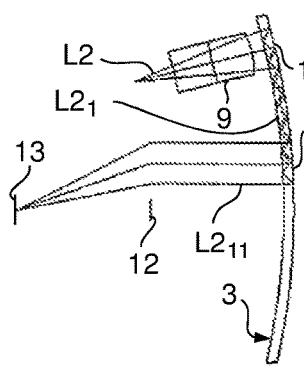
FIGS. 8a-8e are detailed views according to FIG. 2 of different couplings-out of a second light bundle.
Figure 8B:
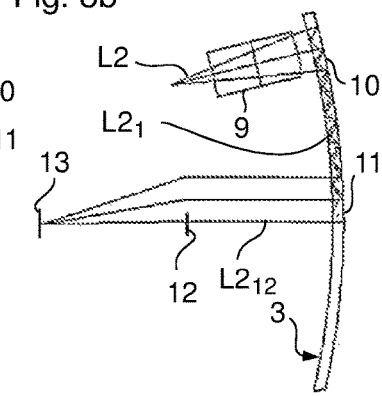
Figure 8C:
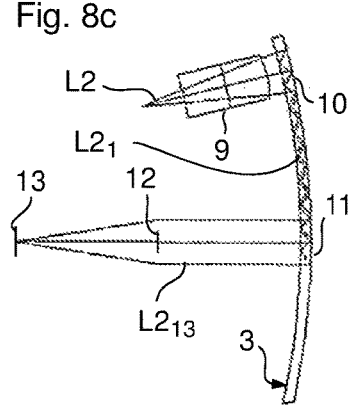
Figure 8D:
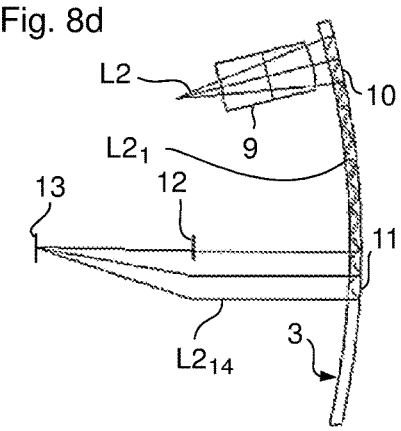
Figure 8E:
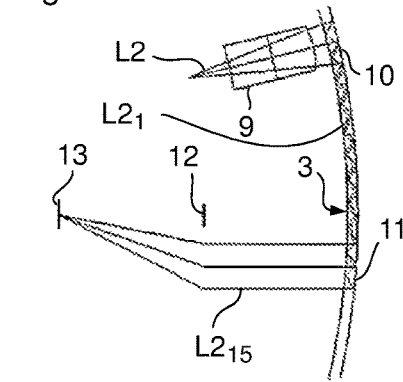

In FIG. 7, the second sub-bundles $L1_{11}$-$L1_{15}$ for the five couplings-out of the first sub-bundle $L1_1$ are represented in the plane of the pupil of the eye 12, wherein the second sub-bundles $L1_{13}$-$L1_{15}$ which are not actually generated and are only described to illustrate the invention are drawn in with dashed lines.

Figure 9:
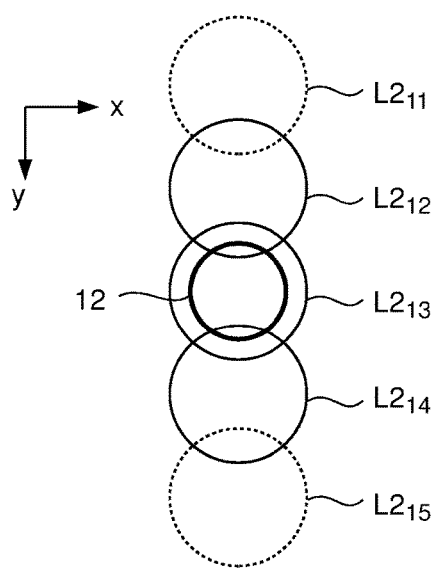
FIG. 9 is a top view of the coupled-out partial light bundle according to FIGS. 8a-8e in the plane of the pupil of the eye.
Figure 10A:
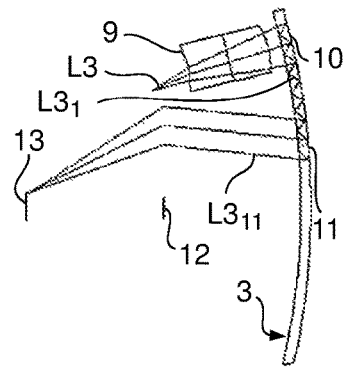
FIGS. 10a-10e are detailed views according to FIGS. 6a-6e of different couplings-out of a third light bundle.
Figure 10B:
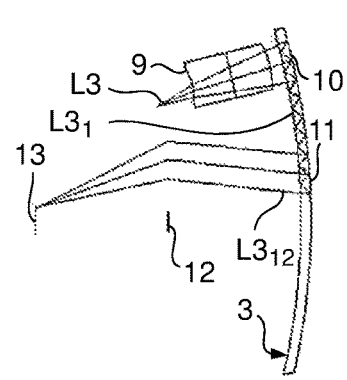
Figure 10C:
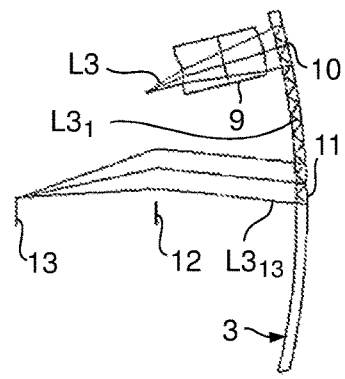
Figure 10D:
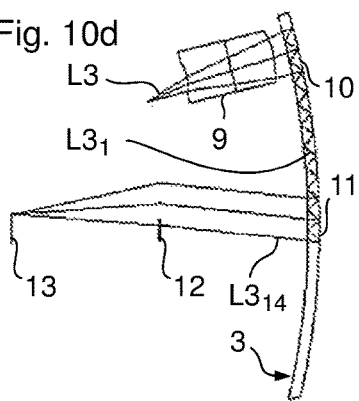
Figure 10E:
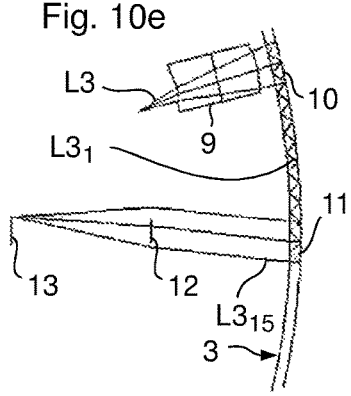

In FIGS. 8a-8e, the five couplings-out of the first light bundle $L2_1$ are represented for a central angle of field in which the angle of incidence is perpendicular on the pupil of the eye 12, which corresponds to a y value on the imaging system of 0 mm and thus to the center of the imaging system 8 in the same way as in FIGS. 6a-6e. In FIG. 9, in the same way as in FIG. 7, the position of the pupil of the eye 12 is represented relative to the five second sub-bundles $L2_{11}$, $L2_{12}$, $L2_{13}$, $L2_{14}$, $L2_{15}$. It can be seen from the representations according to FIGS. 8a-8e and FIG. 9 that the third coupling-out $L2_{13}$ of the first sub-bundle $L2_1$ delivers the most light to the observer. The second and fourth couplings-out $L2_{12}$ and $L2_{14}$ only contribute a small portion. Therefore, the coupling-out grating 30 is designed such that the coupling out of the first sub-bundle $L2_1$ takes place during the second to fourth strike on the fourth coupling-out grating 30.

Figure 11:
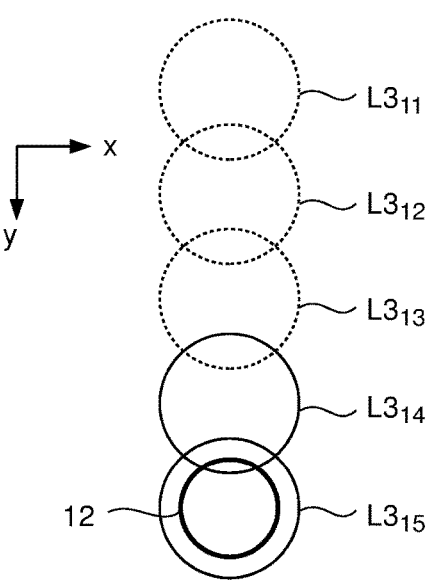
FIG. 11 is a top view of the coupled-out partial light bundles according to FIGS. 10a-10e in the plane of the pupil of the eye.

In FIGS. 10a-10e, in the same way as in FIGS. 6a-6e, the coupling-out is shown for a lower angle of field of −6° (first sub-bundle $L3_1$) on the pupil of the eye 12, which corresponds to a y value of −2 mm from the center on the two-dimensional light modulator of the image generating module 8. In FIG. 11, in turn, the position of the pupil of the eye 12 is shown relative to the coupled-out partial light bundles $L3_{11}$, $L3_{12}$, $L3_{13}$, $L3_{14}$, $L3_{15}$ in top view according to FIG. 7. It can be seen from FIGS. 10a-10e and 11 that the main portion of the light originates from the fifth coupling-out $L3_{15}$. The fourth coupling-out $L3_{14}$ also contributes to a small degree. Therefore, the coupling-out grating 30 is designed such that the coupling out of the first sub-bundle $L3_1$ takes place during the fourth and fifth strikes.

Figure 12:
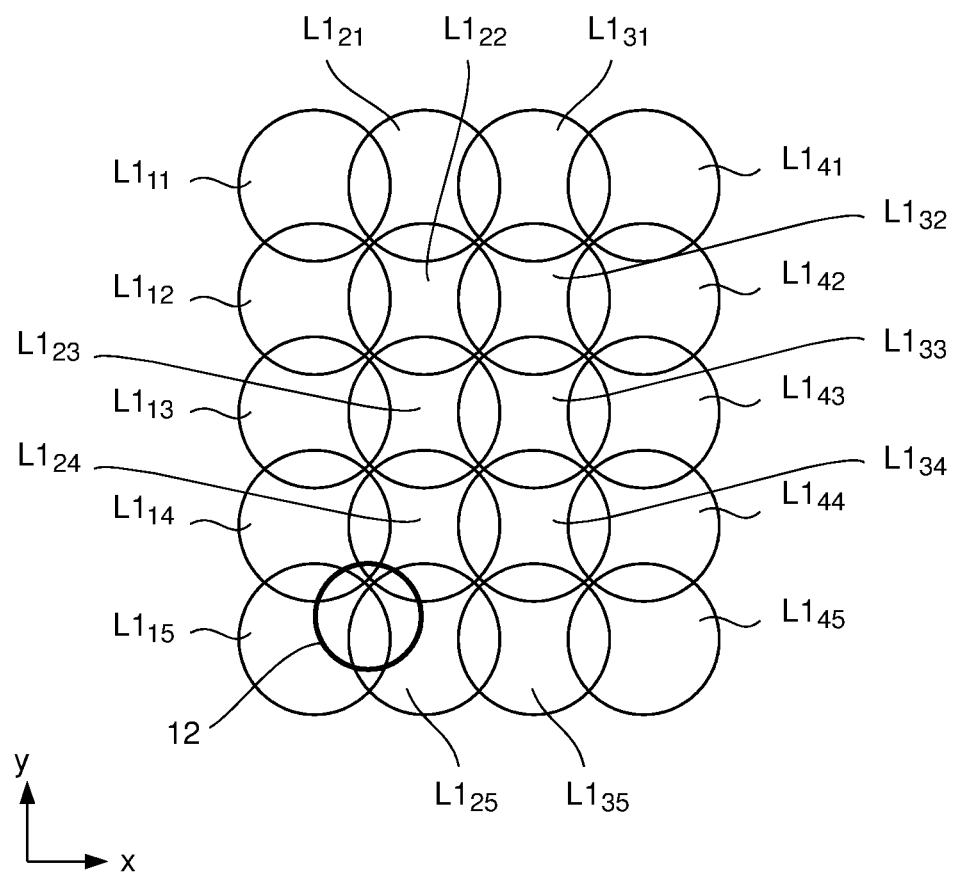
FIG. 12 is a further top view of the coupled-out second sub-bundle.

In FIG. 12, all of the second sub-bundles $L1_{11}$-$L1_{15}$, $L1_{21}$-$L1_{25}$, $L1_{31}$-$L1_{35}$ and $L1_{41}$-$L1_{45}$ of the light bundle L1 are shown schematically in the plane of the pupil of the eye or in the exit pupil of the imaging optical system 14. This shows the size or enlargement of the exit pupil achieved in the x and y direction.

The coupling-out grating 30 preferably has the optimal grating structure for each coupling-out, wherein the grating structure is preferably designed such that, for angles of field which are served by several neighboring couplings-out, congruence is achieved. By this is meant that, within the framework of the resolution of an eye (<1 min) the same location on the retina 13 is struck. It can also be said that the same main beam angle is present for these neighboring couplings-out (neighboring second sub-bundles) for one angle of field. This can be achieved e.g. in that both the third grating 29 and the fourth grating 30 are designed imaging and are simultaneously optimized in conjunction with the specific shape of the first spectacle lens 3 such that, on the one hand, the demands of the modulation transfer function are met and, on the other hand, the described congruence is achieved. As a rule, an angle of field or field point is served by at most three couplings-out neighboring in the y direction, with the result that the congruence is thus to be achieved for at most three neighboring couplings-out, which can be easily achieved in practice.

If the third and fourth gratings 29, 30 are designed imaging, imaging errors which are caused by the oblique incidence of the first sub-bundles $L1_1$-$L3_1$ on the fourth grating 30, such as e.g. astigmatism and coma, can be compensated for. The oblique incidence on the fourth grating 30 is inevitably present as the first sub-bundles $L1_1$-$L3_1$ are guided to the fourth grating 30 by total internal reflection at the front and rear side 5, 6 of the first spectacle lens 3.

The additional optical system 9 is designed such that the light bundles L1-L3 strike the spectacle lens 3 or the coupling-in section 10 as collimated light bundles. However, the additional optical system 9 can also be dispensed with. In this case, the coupling-in section 10 can take over this collimation function for example.

The entrance pupil of the imaging optical system 14 is preferably placed on or near the third grating 29, in order to achieve as small as possible a dilation of the light spot of the light bundles or light beam bundles L1-L3 of all pixels of the two-dimensional light modulator of the image-generating module 8 on the third grating 29.

Furthermore, the third and fourth gratings 29, 30 preferably have approximately the same center frequency, in order to minimize the spectral dependence. In addition, the third and fourth gratings 29, 30 can have a base dispersion of approximately the same size, whereby it is achieved on the one hand that the light is diffracted out of the spectacle lens 3 again in the direction of the eye. On the other hand, it is achieved that the color-dependent diffraction angles approximately compensate for each other. All colors thereby propagate after leaving the spectacle lens 3 in each case, as far as possible, in the same direction, with the result that colors can be prevented from spreading apart noticeably. To achieve the congruence, the stacking of the individual neighboring couplings-out of the respective second sub-bundle to the required target image location can be inserted, as evaluation parameter, into the merit function of the normal optimization, i.e. for each target image location the different possible coupling-out branches on which light can reach the target image location are optimized in respect of image quality (modulation transfer function, spot size, etc.) as well as precision of superimposition. Degrees of freedom here are the position of the laser sources which are used in the illumination of the holograms to generate the third and fourth gratings 29, 30. Because of the relatively small spectacle lens thickness, the differences in the interference state of the wave, which are caused by the total reflection at the curved spectacle lens 3, 4, are relatively small for the neighboring couplings-out, and can therefore be optimized very well.

The features and designs of the third and fourth grating 29 and 30 can be realized in the same way as in the case of the first and second grating 27 and 28. These two gratings 27 and 28 can also be designed such that e.g. color-dependent diffraction angles are approximately compensated for. The two gratings 27 and 28 can also be optimized together.

Moreover, additional correction optical systems (e.g. lenses, mirrors, computer-generated holograms, etc.) can also be brought into the illumination structure of the holograms in order to achieve an additional improvement in performance.

In order to achieve as homogeneous as possible a field profile in terms of intensity, the diffraction efficiency of the fourth grating 30 and/or of the second grating 28 can e.g. increase as the coupling-out increases. This can be achieved by a suitable course of the profile depth of the respective grating 30, 28. Thus, in the first coupling-out, only a relatively small part of the possible diffraction efficiency is used and the diffraction efficiency increases from the first to the last coupling-out.

Furthermore, it is possible to arrange a graduated filter (e.g. variable grey filter) close to the image-generating module 8. It is also possible to provide an adapted location-dependent radiation characteristic of the imaging system in terms of intensity.

In order to achieve as good as possible a result for white light, the third grating 29 and the fourth grating 30 can in each case be formed as an overlay of e.g. three corresponding gratings, the center frequencies of which are designed such that the bundles for the corresponding middle wavelengths are superimposed. Here, in each case, a pair of gratings can e.g. be adapted to red light, green light and blue light. The same applies to the first and second gratings 27, 28.

A further improvement of the efficiency properties can be achieved by designing third and fourth gratings 29, 30 and/or the first and second gratings 27, 28 in each case as a reflective volume grating.

The coupling-out section 11 is designed such that the user can perceive the coupled-out virtual image superimposed on the surroundings. Furthermore, the third and fourth gratings 29, 30 can be formed in each case on the front side 5 as a reflective grating. The two plate-shaped sections 20, 21 can be formed e.g. by generating a slit for the air gap 22 in the edge area 15.

In the display device according to the invention the first sub-bundles thus strike the fourth grating 30 a maximum of n times depending on the position of the associated pixel of the imaging system, wherein n is an integer greater than or equal to 3. In the embodiment described here n is equal to 5. In addition, each first sub-bundle is coupled out depending on the position of the associated pixel in the case of 1 to m successive strikes on the fourth grating 30, wherein m is an integer greater than or equal to 1 and is smaller than n. In the embodiment described here m is 2 for the first sub-bundle of the light bundle L1, 3 for the first sub-bundle of the light bundle L2 and 2 for the first sub-bundle of the light bundle L3. The coupling out of the respective first sub-bundle begins at the latest at the $(n-m+1)^{th}$ strike on the fourth grating 30. In the case of the first sub-bundle $L1_1$ the coupling-out begins at the first strike, in the case of the first sub-bundle $L2_1$ the coupling-out begins at the second strike and in the case of the first sub-bundle $L3_1$ the coupling-out begins at the fourth strike on the fourth grating 30.

In addition, in the described embodiment it is the case that two to three couplings-out or diffraction couplings-out are needed for the desired coupling-out of the corresponding first sub-bundle. However, it is also possible for only one diffraction coupling-out to be needed for at least one of the first sub-bundles L1-L3.

As the third grating 29 has to diffract the first sub-bundles $L1_1$-$L1_4$ so strongly that the first sub-bundles $L1_1$-$L1_4$ are then guided in the spectacle lens 3 by a total internal reflection, a grating frequency of approx. 1700-2300 lines/mm is needed. In the case of green light e.g. a grating frequency of approx. 2000 lines/mm is needed, in the case of red light e.g. a grating frequency of approx. 1700/mm and in the case of blue light e.g. a grating frequency of approx. 2300/mm. The same then applies to the fourth grating 30, which has to couple out, towards the eye of the user, the first sub-bundles $L1_1$-$L1_4$ directed onto it by means of total reflection. It is therefore preferred to produce the third and fourth gratings 29, 30 by holographic illumination with plane and/or spherical waves. The positions of the laser sources which are used in the illumination of the holograms are possible correction parameters for the correction of the modulation transfer function and the congruence. For improvement, in particular deformed wavefronts can also be used. During the illumination of the gratings, special optical systems or also computer-generated holograms can be introduced into the illumination beam path to further improve the overall performance.

In the embodiment described hitherto the coupling-in and coupling-out sections 10, 11 are in each case formed diffractive. It is also possible, however, to form the coupling-in and coupling-out sections 10, 11 in each case as non-diffractive sections. For example, the coupling-in and coupling-out sections 10, 11 can be formed in each case as a partially reflective section.

Figure 13:
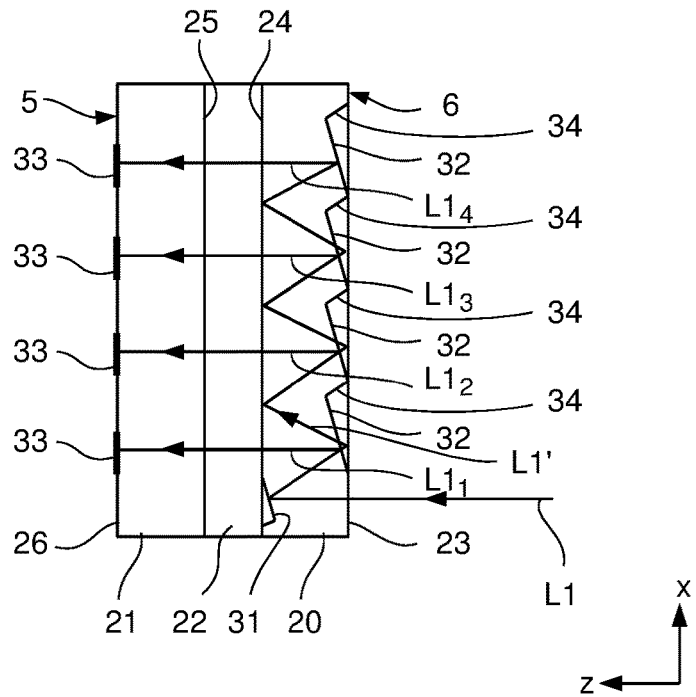
FIG. 13 is a view of the coupling-in section according to a further embodiment.

In FIG. 13 the coupling-in section 10 is represented schematically in the same way as in FIG. 4, wherein the same elements are labelled with the same reference numbers and in the description of which reference is made to the above statements. In contrast to the embodiment according to FIG. 4, in the case of the coupling-in section 10 according to FIG. 13, no gratings are provided, but rather a reflective facet 31 is provided at the second side 24 of the first plate-shaped section, partially reflective facets 32 are provided at the first side 23 of the first plate-shaped section 20 and reflective facets 33 are provided at the second side 26 of the second plate-shaped section 21.

The facets 31-33 are directed such that a light bundle L1 entering the first plate-shaped section 20 via the first side 23 is reflected back towards the first side 23 and strikes a first (or several) facet(s) 32. A portion of the light bundle L1 is deflected as a first sub-bundle $L1_1$ such that it runs through the second side 24, the first side 25 and strikes the reflective facets 33 which bring about the deflection in the y direction. The portion of the light bundle L1 which is not reflected at the facet 32 runs through the facet 32 and strikes the first side 23 at which a total internal reflection in the direction of the second side 24 takes place, with the result that this portion L1' again runs through the partially reflective facet 32, is in turn deflected at the second side 24 towards the first side 23 by total internal reflection and thus strikes the partially reflective facets 32 again. In the same way, a splitting up takes place there in turn, with the result that the light bundle L1 is divided into several sub-bundles $L1_1$-$L1_4$, which are coupled into the spectacle lens 3 in such a way that they are guided to the coupling-out section 11 by total internal reflection at the rear and front side 6, 5.

The partially reflective facets are connected by faces 34. These can preferably be transparent or partially transparent, with the result that light beams totally reflected at the first side 32 can also run through the faces 34.

Figure 14:
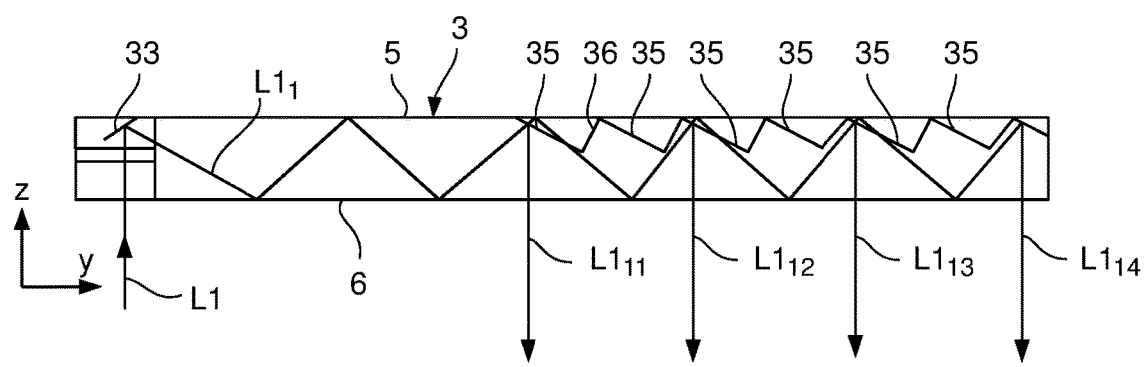
FIG. 14 is a sectional view of the spectacle lens 3 to explain the further embodiment.

As can be learned from the representation in FIG. 14, the coupling-out section 11 comprises several partially reflective facets 35 which are connected by faces 36, which are preferably transparent or partially reflective.

As can be learned from the representation in FIG. 14, the partially reflective facets 35 act as beam splitters, with the result that the portion of the first sub-bundle $L1_1$ which is reflected in each case is coupled out as second sub-bundle $L1_{11}$-$L1_{14}$ and guides the transmitted portion to a further coupling-out (offset in the y direction) after another total reflection at the front side 5 and rear side 6.

Of course, the described embodiments can also be combined with each other. Thus, for example, the facets 31, 32 described in conjunction with FIG. 13 can be formed at the first plate-shaped section 20, while the third grating 29 is provided at the second plate-shaped section 21 and the fourth grating 30 is provided in the coupling-out section 10. Furthermore, it is possible to provide the first and second gratings 27 and 28 at the first plate-shaped section and to provide the corresponding facets 33 and 35 at the second plate-shaped section 21 as well as in the coupling-out section 11.

The five couplings-out described are meant by way of example only. Of course, fewer (but at least three) or more couplings-out can also be provided. With more couplings-out, a larger field of view can be provided.

In addition, up to now, the display device according to the invention has only been described for one spectacle lens (the left-hand spectacle lens 3). The display device according to the invention can be formed such that additional items of information (image of the imaging system 8) are only generated via one spectacle lens (for example the left-hand spectacle lens) and reflected to the user in his field of vision. Of course, it is also possible to form both spectacle lenses, with the result that additional items of information can be reflected to the user for both eyes. In this case, the items of information can also be reflected such that a three-dimensional image impression of the reflected information forms for the user.

The spectacle lenses 3, 4 can be spectacle lenses for correcting defective vision. However, they do not have to be such spectacle lenses; they can also have no optical correction effect in respect of a sight defect. The display device 1 according to the invention can be formed as sports glasses, sunglasses and/or glasses for correcting defective vision.

The spectacle lenses 3, 4 and in particular the left-hand spectacle lens 3 are described together with the display device 1 according to the invention only by way of example.

The spectacle lenses 3, 4, or at least the left-hand spectacle lens 3, are in each case formed separately as spectacle lens 3, 4 according to the invention. The left-hand spectacle lens 3 according to the invention can, naturally, also be formed as the right-hand spectacle lens.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A spectacle lens for a display device that can be fitted on the head of a user and generate an image, comprising:
   a front side and a rear side, wherein at least one of the front side and the rear side are curved, and as seen in top view onto the spectacle lens, a coupling-in section in an edge area of the spectacle lens and a coupling-out section in a central area of the spectacle lens,
   wherein the spectacle lens couples light bundles of pixels of the generated image into the spectacle lens via the coupling-in section, guides the light bundles of pixels in the spectacle lens to the coupling-out section and couples the light bundles of pixels out of the spectacle lens via the coupling-out section,
   wherein, during the coupling-in, the coupling-in section divides at least one of the light bundles in each case into several first sub-bundles and couples the first sub-bundles into the spectacle lens offset from each other in a first direction in such that the first sub-bundles are guided in the spectacle lens to the coupling-out section along a second direction running transverse with respect to the first direction and towards the coupling-out section,
   wherein, during the coupling-out, the coupling-out section divides at least one of the first sub-bundles in each case into several second sub-bundles and couples the second sub-bundles out of the spectacle lens offset from each other in the second direction, and
   wherein the coupling-in section comprises several partially reflective first facets in order to bring about the division into the first sub-bundles via reflection along the first direction within the spectacle lens and direct the first sub-bundles in the second direction within the spectacle lens, and the coupling-out section comprises several partially reflective second facets in order to bring about the division into the second sub-bundles via reflection and transmission.

2. The spectacle lens according to claim 1, wherein a first reflective layer or a first reflective surface is arranged behind the partially reflective first facets and a second reflective layer or a second reflective surface is arranged in front of the partially reflective first facets such that portions of the first sub-bundles transmitted through the partially reflective first facets are reflected at the first reflective layer or the first reflective surface, run from behind through the partially reflective first facets, and are again reflected by the second reflective layer or the second reflective surface onto the partially reflective first facets at a location which is offset relative to the first strike at the partially reflective first facets.

3. The spectacle lens according to claim 2, wherein a third reflective layer or a third reflective surface is arranged behind the partially reflective second facets and a fourth reflective layer or a fourth reflective surface is arranged in front of the partially reflective second facets such that portions of the second sub-bundles transmitted through the partially reflective second facets are reflected at the third reflective layer or the third reflective surface, run from behind through the partially reflective second facets, and are again reflected by the fourth reflective layer or the fourth reflective surface onto the partially reflective second facets at a location which is offset relative to the first strike at the partially reflective second facets.

4. The spectacle lens according to claim 1,
   wherein a first reflective layer or a first reflective surface is arranged behind the partially reflective first facets and a second reflective layer or a second reflective surface is arranged in front of the partially reflective first facets such that portions of the first sub-bundles transmitted through the partially reflective first facets are reflected at the first reflective layer or the first reflective surface, run from behind through the partially reflective first facets, and are again reflected by the second reflective layer or the second reflective surface onto the partially reflective first facets at a location which is offset relative to the first strike at the partially reflective first facets, and
   wherein a third reflective layer or a third reflective surface is arranged behind the partially reflective second facets and a fourth reflective layer or a fourth reflective surface is arranged in front of the partially reflective second facets such that portions of the second sub-bundles transmitted through the partially reflective second facets are reflected at the third reflective layer or the third reflective surface, run from behind through the partially reflective second facets and are again reflected by the fourth reflective layer or the fourth reflective surface onto the partially reflective second facets at a location which is offset relative to the first strike at the partially reflective second facets.

5. A display device, comprising:
   a holder that can be fitted on the head of a user;
   an image-generating module secured to the holder, which generates an image; and
   an imaging optical system secured to the holder, which comprises a spectacle lens according to claim 1 and which, when the holder is fitted on the head, images the generated image such that the user can perceive it as a virtual image.

* * * * *